United States Patent
Hatfield et al.

(10) Patent No.: US 9,009,386 B2
(45) Date of Patent: *Apr. 14, 2015

(54) SYSTEMS AND METHODS FOR MANAGING READ-ONLY MEMORY

(75) Inventors: Brian D. Hatfield, Tucson, AZ (US); Wenjeng Ko, Tucson, AZ (US); Lei Liu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 512 days.

This patent is subject to a terminal disclaimer.

(21) Appl. No.: 12/966,055

(22) Filed: Dec. 13, 2010

(65) Prior Publication Data

US 2012/0151167 A1      Jun. 14, 2012

(51) Int. Cl.
*G06F 12/00* (2006.01)
*G06F 12/14* (2006.01)
*G06F 12/10* (2006.01)

(52) U.S. Cl.
CPC .............. *G06F 12/145* (2013.01); *G06F 12/10* (2013.01)

(58) Field of Classification Search
None
See application file for complete search history.

(56) References Cited

U.S. PATENT DOCUMENTS

| | | | |
|---|---|---|---|
| 7,290,112 B2 | 10/2007 | Aguilar, Jr. et al. | |
| 2006/0136677 A1* | 6/2006 | Fuhs et al. | 711/147 |
| 2007/0283124 A1 | 12/2007 | Menczak et al. | |
| 2008/0098265 A1 | 4/2008 | Dmitrovich et al. | |
| 2008/0148048 A1 | 6/2008 | Govil et al. | |
| 2009/0287894 A1 | 11/2009 | Renno | |
| 2009/0320042 A1 | 12/2009 | Thelen et al. | |
| 2010/0023702 A1 | 1/2010 | Landau et al. | |
| 2010/0115228 A1 | 5/2010 | Parker et al. | |
| 2010/0235579 A1* | 9/2010 | Biles et al. | 711/125 |

OTHER PUBLICATIONS

John L. Hennessy and David A. Patterson, Computer Organization and Design, 1998, Morgan Kauffman Publishers, Inc., second edition, pp. 580, 581, 585, 589, 594, 596, 597, 598, 601.*
John L. Hennessy and David A. Patterson, Computer Organization and Design, 1998, Morgan Kauffman Publishers, Inc., second edition, pp. 580-598.*
John Shapley Gray, Interprocess Communications in UNIX: the Nooks annd Crannies, 1998, Prentice Hall, Inc., $2^{nd}$ edition, pp. 183, 193-213.*
Jim Mauro, Shared memory uncovered, [online] Dec. 11, 2000, [retrieved on Apr. 17, 2014], retrieved from the Internet: <URL: https://web.archive.org/web/20001211233400/http://sunsite.uakom.sk/sunworldonline/swo1-09-1997/swo1-09-insidesolaris.html>.*
US 7,565,505, 07/2009, Peinado et al. (withdrawn)

\* cited by examiner

*Primary Examiner* — Midys Rojas
(74) *Attorney, Agent, or Firm* — Griffiths & Seaton PLLC

(57) ABSTRACT

A system includes a memory device including a real memory and a tracking mechanism configured to track relationships between multiple virtual memory addresses and real memory. The system further includes a processor configured to perform the below method and/or execute the below computer program product. One method includes mapping a first virtual memory address to a real memory in a memory device and mapping a second virtual memory address to the real memory. Here, the first virtual memory address is authorized to modify data in the real memory and the second virtual memory address is not authorized to modify the data in the real memory. One computer storage medium includes a computer program product for performing the above method.

11 Claims, 3 Drawing Sheets

SYSTEMS AND METHODS FOR MANAGING READ-ONLY MEMORY

BACKGROUND OF THE INVENTION

1. Field of the Invention

The present invention relates in general to storage systems, and particularly, to systems and methods for managing read-only memory.

2. Description of the Related Art

Read-only memory is often used in contemporary storage systems. To access the data in read-only memory, real memories in the read-only memory are mapped to a first table and virtual memory addresses for the real memory are mapped to a second table. Each virtual memory address translated to a real memory so that a processor is capable of locating a particular real memory when the processor desires to access data in the particular real memory. Furthermore, each virtual memory address is only authorized to read the data stored in the real memory.

When the data stored in a particular real memory of a contemporary read-only memory needs to be modified, the virtual memory address that translates to the particular real memory is temporarily attached with authorization to read and write data to the particular real memory. While the virtual memory address that translates to the particular real memory is temporarily attached with authorization to read and write data to the particular real memory, any entity that has access to the virtual memory address that translates to the particular real memory is capable of write data to the particular real memory and/or modifying the data stored in the particular real memory, which is undesirable.

SUMMARY OF THE INVENTION

Various embodiments provide systems for managing read-only memory. One system comprises a memory device including a plurality of real memory addresses, a tracking mechanism coupled to the memory device and configured to track relationships between a plurality of virtual memory addresses and the plurality of real memory addresses, and a processor coupled to the memory device and the tracking mechanism. The processor is configured to map, via the tracking mechanism, a first virtual memory address to a real memory and map, via the tracking mechanism, a second virtual memory address to the real memory. In this embodiment, the first virtual memory address is authorized to modify data in the real memory and the second virtual memory address is not authorized to modify the data in the real memory.

Other embodiments provide computer storage mediums comprising a computer program product method for managing read-only memory in a storage system including a processor and a tracking mechanism. One computer storage medium comprises computer code for mapping, by the processor via the tracking mechanism, a first virtual memory address to a real memory in a memory device and computer code for mapping, by the processor via the tracking mechanism, a second virtual memory address to the real memory. In one embodiment, the first virtual memory address is authorized to modify data in the real memory and the second virtual memory address is not authorized to modify the data in the real memory.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments discussed below provide systems and methods for managing read-only memory. Also provided below are computer storage mediums comprising computer program product methods for managing read-only memory.

Figure 1:
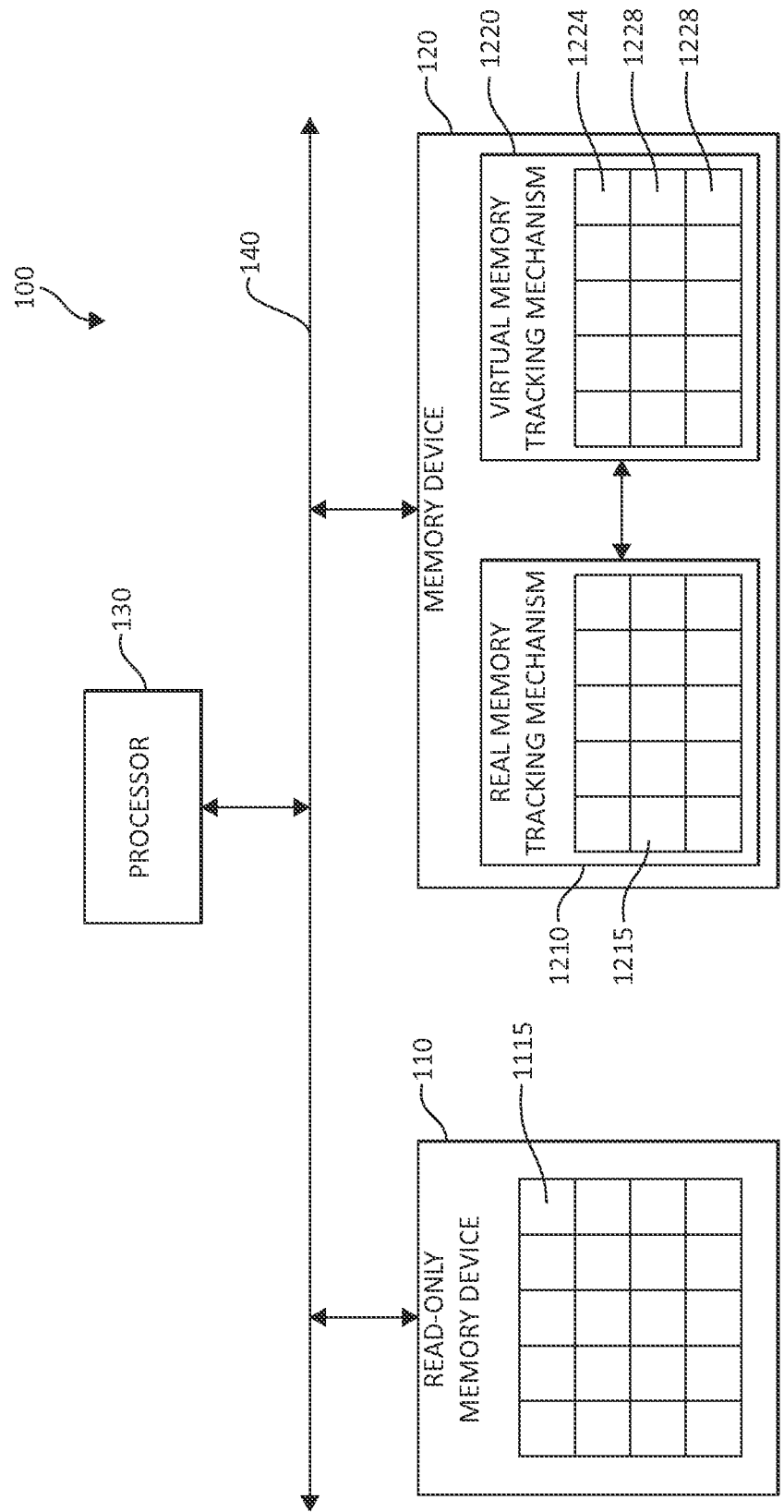
FIG. 1 is a block diagram of one embodiment of a system for managing read-only memory.

Turning now to the figures, FIG. 1 is a block diagram of one embodiment of a system 100 for managing read-only memory. At least in the illustrated embodiment, system 100 comprises a read-only memory device 110, a memory device 120, and processor 130 coupled to one another via a bus 140 (e.g., a wired and/or wireless bus).

Read-only memory device 110 may be any read-only memory device known in the art or developed in the future. That is, read-only memory device 110 may include any known or developed structure and/or known or developed memory capacity (e.g., size). In various embodiments, read-only memory device 110 is partitioned into one or more real memories 1115 capable of storing data and are capable of being mapped for access via a plurality of virtual memory addresses (virtual memory addresses 1224, 1228) stored in, for example, memory device 120.

Memory device 120, at least in the illustrated embodiment, comprises a real memory tracking mechanism 1210 and a virtual memory address tracking mechanism 1220 in communication with one another. Real memory tracking mechanism 1210 may be any tracking mechanism known or developed in the future capable identifying the location of the real memory in read-only memory 110. Examples of real memory tracking mechanism include, but are not limited to, one or more bitmaps, one or more tables, metadata, and the like tracking mechanisms.

Virtual memory address tracking mechanism 1220 is configured to translate more than one virtual memory address for at least a portion of the real memory in real memory tracking mechanism 1210. That is, virtual memory address tracking mechanism 1220 includes two or more virtual memory addresses for one or more real memories stored in real memory tracking mechanism 1210.

In various embodiments, a virtual memory address 1224 in virtual memory address tracking mechanism 1220 translates to a real memory 1215 in real memory tracking mechanism 1210 and is authorized to read and modify the data stored in real memory 1115 associated with real memory 1215 and/or read and write data to real memory 1115. In addition, one or more additional virtual memory addresses 1228 in virtual memory address tracking mechanism 1220 also translate to real memory 1215 and are authorized to read the data in real memory 1115, but are not authorized to modify the data stored in real memory 1115 and are not authorized to write data to real memory 1115. Here, the one or more virtual memory addresses 1228 that translate to real memory 1215 but are not authorized to modify the data in and/or write data to real memory 1115 may each be considered a "public address." The public address may be provided to multiple entities that need/desire read access to the data stored in real memory 1115. Furthermore, virtual memory address 1224, which also translates to real memory 1115 and is authorized to read and modify the data in and/or read and write data to real memory 1115 may be considered a "private address." In contrast to the public address or addresses, the private address may only be provided to one or more select entities that need/desire write access to real memory 1115.

In one embodiment, virtual memory address 1224 is permanently included within virtual memory tracking mechanism 1220. That is, an entity that is authorized to read and modify data in/write data to real memory 1115 is capable of accessing real memory 1115 utilizing an ever-present virtual memory address 1224.

This embodiment is more secure than previous systems/methods for managing read-only memory because a select few entities are provided with modify/write access to at least portions of read-only memory device 110. Furthermore, this embodiment is faster than previous systems/methods for managing read-only memory because virtual memory address 1224 is always available for use to access real memories 1115.

In an alternative embodiment, virtual memory address 1224 is not permanently included within virtual memory tracking mechanism 1220, but is "temporarily attached" to virtual memory tracking mechanism 1220. In this embodiment, virtual memory tracking mechanism 1220 does not always include virtual memory address 1224, but includes virtual memory address 1224 when an entity needs/desires to read and modify data in/write data to real memory 1115. That is, virtual memory address 1224 is temporarily added to virtual memory tracking mechanism 1220 when an entity needs/desires to read and modify data in/write data to real memory 1115 and then is removed, deleted, or otherwise rendered inoperable in virtual tracking mechanism 1220 when the entity has completed reading and modifying data in/writing data to real memory 1115.

Similar to the embodiment discussed above, this embodiment is more secure than previous systems/methods for managing read-only memory because a select few entities are provided with modify/write access to at least portions of read-only memory device 110. That is, the two embodiments discussed above do not provide the opportunity for entities that should only have read access to portions of read-only memory device 110 to have write/modify access to the portions of read-only memory device 110.

Processor 130 is configured to create and/or populate real memory tracking mechanism 1210. That is, processor 130 is configured to provide the addresses and/or location of real memory 1115 to real memory tracking mechanism 1210 as a real memory 1215.

In addition, processor 120 is configured to map one or more virtual memory addresses 1224 to one or more real memories 1215. That is, the mapped real memory 1215 or real memories 1215 include at least one virtual memory address 1224 (e.g., a private address) that is authorized to read and modify the data in real memory 1115 and/or read and write data to real memory 1115.

Furthermore, processor 120 is configured to map one or more virtual memory addresses 1228 to one or more real memories 1215. That is, the mapped real memories 1215 include at least one virtual memory address 1228 (e.g., a public address) that is authorized to read the data in real memory 1115, but is not authorized to modify the data in real memory 1115 and is not authorized to write data to real memory 1115.

In various embodiments, processor 130 is configured to temporarily map virtual memory address 1224 to real memory 1215 each time an entity with authorization to modify/write data to real memory 1115 needs/desires to read and modify the data in real memory 1115 and/or read and write data to real memory 1115. In one embodiment, processor 120 is configured to "temporarily attach" virtual memory address 1224 to virtual memory tracking mechanism 1220. In this embodiment, processor 120 is configured to temporarily add virtual memory address 1224 virtual memory tracking mechanism 1220 each time an entity needs/desires to read and modify data in/write data to real memory 1115. Processor 120 is further configured to remove, delete, or otherwise render inoperable virtual memory address 1224 in virtual tracking mechanism 1220 each time the entity has completed reading and modifying data in/writing data to real memory 1115.

In various other embodiments, processor 120 is configured to permanently map virtual memory address 1224 to real memory 1215 in virtual tracking mechanism 1220. In this embodiment, processor 120 maps virtual memory address 1224 to real memory 1215 and is not required to add virtual memory address 1224 to and delete virtual memory address from virtual tracking mechanism 1220.

During operation, processor 120 is configured to receive requests to access real memory 1115. If the write request is received from an entity utilizing virtual memory address 1224 (e.g., a private address), processor 120 is configured to allow the entity to read and modify the data in real memory 1115 and/or read and write data to real memory 1115. If the request is received from an entity utilizing virtual memory address 1228 (e.g., a public address), processor 120 is configured to enable the entity to only read the data in real memory 1115. Should an entity that accesses real memory 1115 via virtual memory address 1228 attempt to write or modify data in real memory 1115, processor is configured to provide the entity with an exception, deny the write/modify request, and/or otherwise prevent the entity from modifying and/or writing data to real memory 1115.

Figure 2:
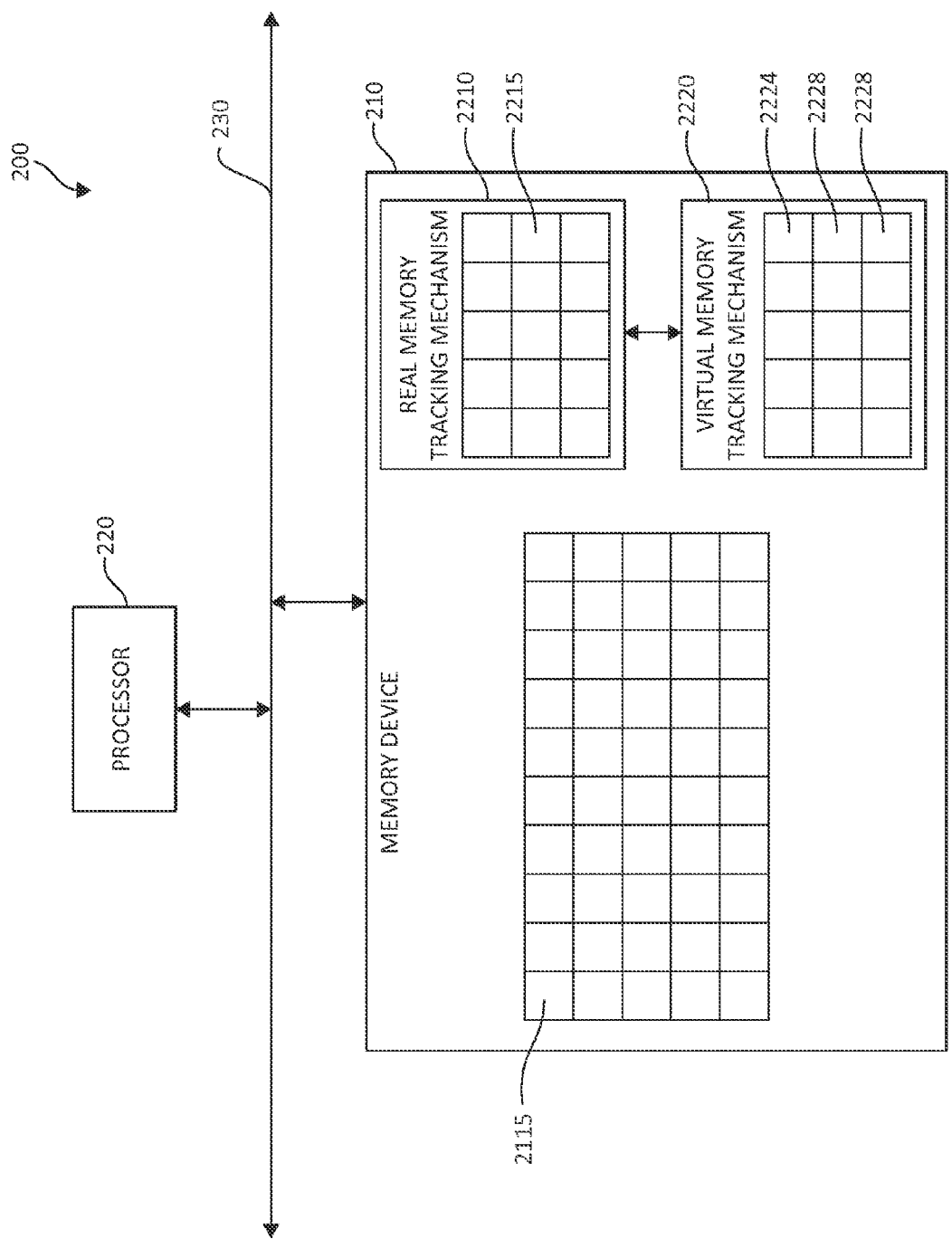
FIG. 2 is a block diagram of another embodiment of a system for managing read-only memory.

Turning now to FIG. 2, FIG. 2 is a block diagram of one embodiment of a system 200 for managing read-only memory. At least in the illustrated embodiment, system 200 comprises a memory device 210 and processor 220 coupled to one another via a bus 230 (e.g., a wired and/or wireless bus).

Memory device 210 may include any structure and/or memory capacity (e.g., size). In various embodiments, memory device 210 is partitioned into one or more real memories 2115. In one embodiment, at least a portion (e.g., one or more) of real memory 2115 are configured to read-only access and are capable of being mapped for access via a plurality of virtual memory addresses (e.g., virtual memory addresses 2224, 2228) stored in memory device 210.

At least in the illustrated embodiment, memory device 210 comprises a real memory tracking mechanism 2210 and a virtual memory address tracking mechanism 2220 in communication with one another. Real memory tracking mechanism 2210 may be any tracking mechanism known or developed in the future capable of managing the allocation of real memory. Examples of real memory tracking mechanism include, but are not limited to, one or more bitmaps, one or more tables, metadata, and the like tracking mechanisms.

Virtual memory address tracking mechanism 2220 is configured to translate more than one virtual memory address for at least a portion of the real memories in real memory tracking mechanism 2210. That is, virtual memory address tracking mechanism 2220 includes two or more virtual memory addresses for one or more real memories stored in real memory tracking mechanism 2210.

In various embodiments, a virtual memory address 2224 in virtual memory address tracking mechanism 2220 translates to a real memory 2215 in real memory tracking mechanism 2210 and is authorized to read and modify the data stored in real memory 2115 associated with real memory 2215 and/or read and write data to real memory 2115. In addition, one or more additional virtual memory addresses 2228 in virtual memory address tracking mechanism 2220 also translate to real memory 2215 and are authorized to read the data in real memory 2115, but are not authorized to modify the data stored in real memory 2115 and are not authorized to write data to real memory 2115. Here, the one or more virtual memory addresses 2228 that translate to real memory 2215 but are not authorized to modify the data in and/or write data to real memory 2115 may each be considered a "public address." The public address may be provided to multiple entities that need/desire read access to the data stored in real memory 2115. Furthermore, virtual memory address 2224, which also translates to real memory 2115 and is authorized to read and modify the data in and/or read and write data to real memory 2115 may be considered a "private address." In contrast to the public address or addresses, the private address may only be provided to one or more select entities that need/desire write access to real memory 2115.

In one embodiment, virtual memory address 2224 is permanently included within virtual memory tracking mechanism 2220. That is, an entity that is authorized to read and modify data in/write data to real memory 2115 is capable of accessing real memory 2115 utilizing an ever-present virtual memory address 2224.

This embodiment is more secure than previous systems/methods for managing read-only memory because a select few entities are provided with modify/write access to at least portions of read-only memory device 210. Furthermore, this embodiment is faster than previous systems/methods for managing read-only memory because virtual memory address 2224 is always available for use to access real memories 2115 rather than changing the access permissions on the virtual (e.g., public) address used in prior systems.

In an alternative embodiment, virtual memory address 2224 is not permanently included within virtual memory tracking mechanism 2220, but is "temporarily attached" to virtual memory tracking mechanism 2220. In this embodiment, virtual memory tracking mechanism 2220 does not always include virtual memory address 2224, but includes virtual memory address 2224 when an entity needs/desires to read and modify data in/write data to real memory 2115. That is, virtual memory address 2224 is temporarily added to virtual memory tracking mechanism 2220 when an entity needs/desires to read and modify data in/write data to real memory 2115 and then is removed, deleted, or otherwise rendered inoperable in virtual tracking mechanism 2220 when the entity has completed reading and modifying data in/writing data to real memory 2115.

Similar to the embodiment discussed above, this embodiment is more secure than previous systems/methods for managing read-only memory because a select few entities are provided with modify/write access to at least portions of read-only memory device 210. That is, the two embodiments discussed above do not provide the opportunity for entities that should only have read access to portions of read-only memory device 210 to have write/modify access to the portions of read-only memory device 210. Furthermore, this embodiment is also faster than previous systems/methods for managing read-only memory because the read-write virtual memory address 2224 is added for use in accessing real memories 2115 rather than changing the access permissions on the virtual (e.g., public) address used in prior systems.

Processor 220 is configured to create and/or populate real memory tracking mechanism 2210. That is, processor 220 is configured to provide the range of real addresses (e.g., real memories 2215) and/or location of real memory 2115 to real memory tracking mechanism 2210.

In addition, processor 220 is configured to map one or more virtual memory addresses 2224 to one or more real memories 2215. That is, the mapped real memory 2215 or real memories 2215 include at least one virtual memory address 2224 (e.g., a private address) that is authorized to read and modify the data in real memory 2115 and/or read and write data to real memory 2115.

Furthermore, processor 220 is configured to map one or more virtual memory addresses 2228 to one or more real memories 2215. That is, real memory 2215 may include at least one virtual memory address 2228 (e.g., a public address) that is authorized to read the data in real memory 2115, but is not authorized to modify the data in real memory 2115 and is not authorized to write data to real memory 2115.

In various embodiments, processor 220 is configured to temporarily map virtual memory address 2224 to real memory 2215 each time an entity with authorization to modify/write data real memory 2115 needs/desires to read and modify the data in real memory 2115 and/or read and write data to real memory 2115. In one embodiment, processor 220 is configured to "temporarily attach" virtual memory address 2224 to virtual memory tracking mechanism 2220. In this embodiment, processor 220 is configured to temporarily add virtual memory address 2224 virtual memory tracking mechanism 2220 each time an entity needs/desires to read and modify data in/write data to real memory 2115. Processor 220 is further configured to remove, delete, or otherwise render inoperable virtual memory address 2224 in virtual tracking mechanism 2220 each time the entity has completed reading and modifying data in/writing data to real memory 2115.

In various other embodiments, processor 220 is configured to permanently map virtual memory address 2224 to real memory 2215 in virtual tracking mechanism 2220. In this embodiment, processor 220 maps virtual memory address 2224 to real memory 2215 and is not required to add virtual memory address 2224 to and delete virtual memory address from virtual tracking mechanism 2220.

During operation, processor 220 is configured to receive requests to access real memory 2115. If the write request is received from an entity utilizing virtual memory address 2224 (e.g., a private address), processor 220 is configured to allow the entity to read and modify the data in real memory 2115 and/or read and write data to real memory 2115. If the request is received from an entity utilizing virtual memory address 2228 (e.g., a public address), processor 220 is configured to enable the entity to only read the data in real memory 2115. Should an entity that accesses real memory 2115 via virtual memory address 2228 attempt to write or modify data in real memory 2115, processor is configured to provide the entity with an exception, deny the write/modify request, and/or otherwise prevent the entity from modifying and/or writing data to real memory 2115.

Figure 3:
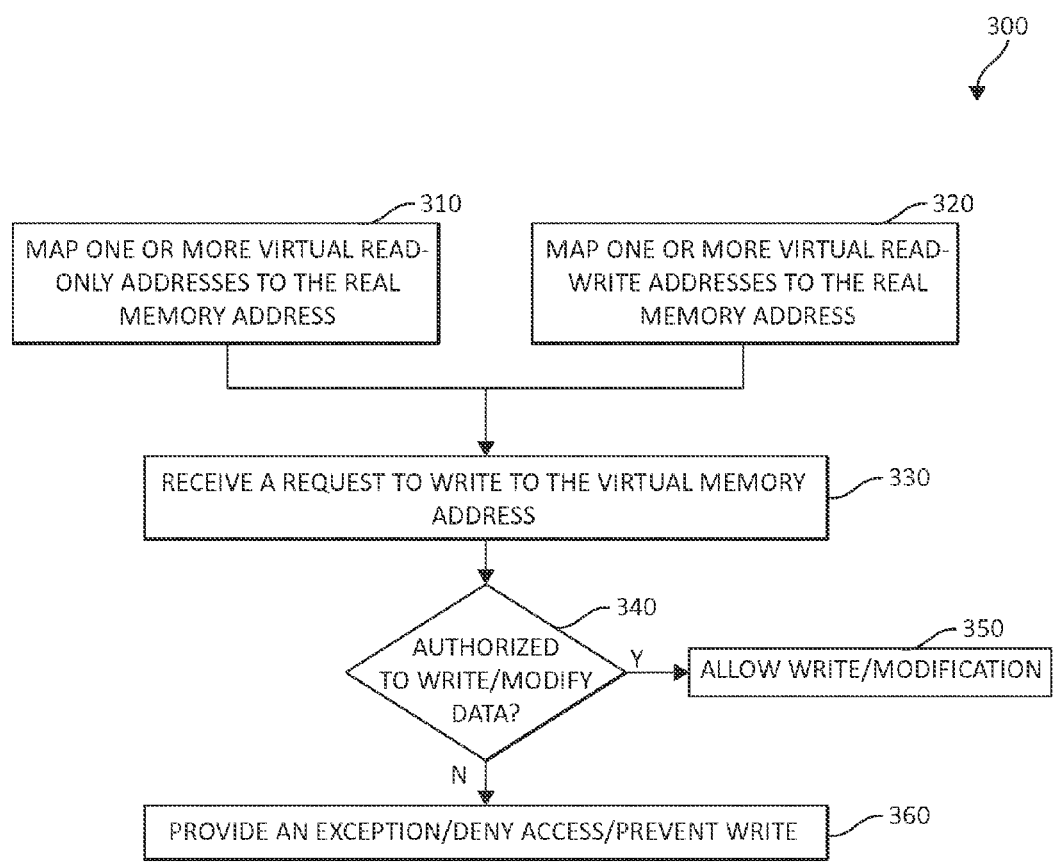
FIG. 3 is a block diagram of one embodiment of a method for managing read-only memory.

Turning now to FIG. 3, FIG. 3 is flow diagram of one embodiment of a method 300 for managing read-only memory. Method 300 begins by mapping one or more virtual memory addresses (e.g., virtual memory address 1228 and virtual memory address 2228) to the real memory (block 310). That is, a real memory is mapped to at least one virtual memory address (e.g., a public address) that is authorized to read the data in the real memory, but is not authorized to modify the data in the real memory and is not authorized to write data to the real memory.

Method 300 further comprises mapping one or more virtual memory addresses (e.g., virtual memory address 1224 and virtual memory address 2224) to the real memory (block 320). That is, the real memory is mapped to at least one virtual memory address (e.g., a private address) that is authorized to read and modify the data in the real memory and/or read and write data to the real memory.

In various embodiments, method 300 comprises temporarily mapping the private address to the real memory when an entity with authorization to modify/write data the real memory needs/desires to read and modify the data in the real memory and/or read and write data to the real memory when mapping the one or more virtual memory addresses. Here, the private address is "temporarily attached" or temporarily added to the virtual memory tracking mechanism. When the entity needs/desires to read and modify data in/write data to the real memory. Method 300 further comprises removing, deleting, or otherwise rendering inoperable the private address in the virtual tracking mechanism when the entity has completed reading and modifying data in/writing data to the real memory.

In various other embodiments, mapping the private address comprises permanently mapping the private address to the real memory in the virtual tracking mechanism when mapping the one or more virtual memory addresses. In this embodiment, an entity is capable of utilizing the ever-present private address to read and write data to the real memory and/or to read and modify the data in the real memory.

Method 300 further comprises receiving requests to access the virtual memory address (block 330) and determining if the entity is authorized to write data to or modify data in the virtual memory address (block 340). If the write request is received from an entity utilizing a private address, the entity is allowed to read and modify the data in the real memory and/or read and write data to the real memory (block 350). If the request is received from an entity utilizing a public address, the entity is provided with an exception, the write/modify request is denied, and/or the entity is otherwise prevented from modifying and/or writing data to the real memory (block 360).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a computer-readable storage medium. A computer readable storage medium may be, for example, but not limited to, an electronic, magnetic, optical, crystal, polymer, electromagnetic, infrared, or semiconductor system, apparatus, or device, or any suitable combination of the foregoing. Examples (a non-exhaustive list) of computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Program code embodied on a computer-readable medium may be transmitted using any appropriate medium, including but not limited to wireless, wired, optical fiber cable, radio frequency (RF), etc., or any suitable combination of the foregoing. Computer program code for carrying out operations for aspects of the present invention may be written in any static language, such as the "C" programming language or similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, one of ordinary skill in the art will appreciate that modifications and adaptations to those embodiments may be made without departing from the scope of the present invention as set forth in the following claims.

The invention claimed is:

1. A computing hardware system for managing read-only memory, comprising:
    a memory device including a plurality of real memory addresses;
    a real memory tracking mechanism and a virtual memory address tracking mechanism
    coupled to the memory device and configured to track relationships between a plurality of virtual memory addresses and the plurality of real memory addresses; and
    a processor coupled to the memory device and the tracking mechanism, wherein the processor is configured to:
        map, via the real tracking mechanism and the virtual memory address tracking mechanism, a first virtual memory address to a real memory, wherein the first virtual memory address is permanently included in the virtual memory address tracking mechanism and translates to the real memory in the real memory tracking mechanism,
        map, via the real tracking mechanism and the virtual memory address tracking mechanism, a second virtual memory address to the real memory, wherein the second virtual memory address temporarily included in the virtual memory address tracking mechanism, wherein:
            the first virtual memory address is authorized to either read and write or read and modify data in the real memory, wherein the first virtual memory address is a private address only provided to at least one select entity desiring to write or modify the data in the real memory, and the first virtual memory address is used to either read and write or read and modify the data by the at least one select entity having either read and write authorization or read and modify authorization to the real memory, and
            the second virtual memory address is not authorized to modify or write the data in the real memory, wherein the second virtual memory address is a public address provided to a plurality of entities desiring to read the data stored in the real memory, and the second virtual memory address is used to read the data,
        receiving a request by an entity to access a virtual memory address and determining if the entity is authorized to write data to or modify data in the virtual memory address,
        allowing the entity to read and modify the data stored in the real memory and also to read and write data to the real memory if a write request is received from the entity utilizing the private address, and
        providing an exception to the write request if a request is received from the entity utilizing the public address.

2. The system of claim 1, wherein the processor is further configured to:
    map, via the real memory tracking mechanism and the virtual memory address tracking mechanism, a third virtual memory address to the real memory, wherein the third virtual memory address is not authorized to modify the data in the real memory, wherein the third virtual memory address is temporarily included in the virtual memory address tracking mechanism, and
    deny a modifying request to modify the data or prevent the entity from modifying and writing the data to the real memory if the request is received from the entity utilizing the public address.

3. The system of claim 1, wherein the processor is configured to temporarily map, via the real memory tracking mechanism and the virtual memory address tracking mechanism, the first virtual memory address to the real memory each time the data in the real memory needs to be modified and remove the mapping of the first virtual memory address to the real memory from the tracking mechanism after each time the data in the real memory is modified when mapping the first virtual memory address to the real memory.

4. The system of claim 1, wherein the processor is configured to permanently map the first virtual memory address to the real memory in the tracking mechanism when mapping the first virtual memory address to the real memory.

5. The system of claim 1, wherein the processor is further configured to:
    receive a request to write first new data to the real memory via the second virtual memory address; and
    provide an exception in response to receiving the request.

6. The system of claim 5, wherein the processor is further configured to:
    receive a request to write second new data to the real memory via the first virtual memory address; and
    write the second new data to the real memory in response to receiving the request.

7. The system of claim 1, wherein the processor is further configured to:
    receive a request to write new data to the real memory via the first virtual memory address; and
    write the new data to the real memory in response to receiving the request.

8. A non-transitory computer-readable storage medium comprising a computer program product for managing read-only memory in a storage system including a processor and a tracking mechanism, comprising:

computer code for mapping, by the processor via a real memory tracking mechanism and a virtual memory address tracking mechanism, a first virtual memory address to a real memory in a memory device, wherein the first virtual memory address is permanently included in the virtual memory address tracking mechanism and translates to the real memory in the real memory tracking mechanism;

computer code for mapping, by the processor via a real memory tracking mechanism and a virtual memory address tracking mechanism, a second virtual memory address to the real memory, wherein the second virtual memory address is temporarily included in the virtual memory address tracking mechanism, wherein:

the first virtual memory address is authorized to either read and write or read and modify data in the real memory, wherein the first virtual memory address is a private address only provided to at least one select entity desiring to write or modify the data in the real memory, and the first virtual memory address is used to either read and write or read and modify the data by the at least one select entity having either read and write authorization or read and modify authorization to the real memory, and the second virtual memory address is not authorized to modify or write the data in the real memory, wherein the second virtual memory address is a public address provided to a plurality of entities desiring to read the data stored in the real memory, and the second virtual memory address is used to read the data, and computer code for receiving a request by an entity to access a virtual memory address and determining if the entity is authorized to write data to or modify data in the virtual memory address, computer code for allowing the entity to read and modify the data stored in the real memory and also to read and write data to the real memory if a write request is received from the entity utilizing the private address, and computer code for providing an exception to the write request if a request is received from the entity utilizing the public address.

9. The computer storage medium of claim 8, further comprising computer code for:

mapping, by the processor via the real memory tracking mechanism and the virtual memory address tracking mechanism, a third virtual memory address to the real memory, wherein the third virtual memory address is not authorized to modify the data in the real memory, wherein the third virtual memory address is temporarily included in the virtual memory address tracking mechanism, and denying a modifying request to modify the data or preventing the entity from modifying and writing the data to the real memory if the request is received from the entity utilizing the public address.

10. The computer storage medium of claim 8, wherein the computer code for mapping the first virtual memory address to the real memory comprises:

computer code for temporarily mapping, via the real memory tracking mechanism and the virtual memory address tracking mechanism, the first virtual memory address to the real memory each time the data in the real memory needs to be modified; and computer code for removing the mapping of the first virtual memory address to the real memory from the tracking mechanism after each time the data in the real memory is modified.

11. The computer storage medium of claim 8, wherein the computer code for mapping the first virtual memory address to the real memory comprises computer code for permanently mapping the first virtual memory address to the real memory in the tracking mechanism.

\* \* \* \* \*